(12) United States Patent
Furihata et al.

(10) Patent No.: US 11,054,330 B2
(45) Date of Patent: Jul. 6, 2021

(54) CALIBRATION WORK SUPPORT DEVICE, CALIBRATION WORK SUPPORT METHOD, AND NON-TRANSITORY COMPUTER READABLE STORAGE MEDIUM

(71) Applicant: YOKOGAWA ELECTRIC CORPORATION, Musashino (JP)

(72) Inventors: Ryouhei Furihata, Tokyo (JP); Yusuke Yokota, Tokyo (JP)

(73) Assignee: YOKOGAWA ELECTRIC CORPORATION, Musashino (JP)

( * ) Notice: Subject to any disclaimer, the term of this patent is extended or adjusted under 35 U.S.C. 154(b) by 347 days.

(21) Appl. No.: 15/979,594

(22) Filed: May 15, 2018

(65) Prior Publication Data

US 2018/0335361 A1 Nov. 22, 2018

(30) Foreign Application Priority Data

May 17, 2017 (JP) .............................. JP2017-098037

(51) Int. Cl.
*G01L 27/00* (2006.01)
*G01D 18/00* (2006.01)

(52) U.S. Cl.
CPC ............ *G01L 27/005* (2013.01); *G01D 18/00* (2013.01); *G01L 27/002* (2013.01)

(58) Field of Classification Search
CPC ...... G01L 27/005; G01L 27/002; G01D 18/00
See application file for complete search history.

(56) References Cited

U.S. PATENT DOCUMENTS

| | | | |
|---|---|---|---|
| 6,374,191 B1 * | 5/2002 | Tsuchiya | G01L 27/002 702/104 |
| 6,615,114 B1 | 9/2003 | Skiba et al. | |
| 2009/0199615 A1 | 8/2009 | Fukai | |
| 2010/0107723 A1 | 5/2010 | Hajishah et al. | |
| 2016/0132618 A1 * | 5/2016 | Lovell | G01D 3/02 703/8 |

FOREIGN PATENT DOCUMENTS

| | | |
|---|---|---|
| CN | 101510088 A | 8/2009 |
| JP | 2014-238361 A | 12/2014 |

* cited by examiner

*Primary Examiner* — Yoshihisa Ishizuka
(74) *Attorney, Agent, or Firm* — Sughrue Mion, PLLC

(57) ABSTRACT

A calibration work support device includes a calibration target setter that sets a target value of a simulation signal input to a device in calibration of the device, a simulation signal acquirer that acquires an input value based on the simulation signal, a proper range determiner that determines whether the input value is within a proper range for the target value, a proper range notifier that notifies a user whether the input value is within the proper range, an output value acquirer that acquires an output value output from the device in accordance with the simulation signal, a condition determiner that determines whether at least one of the input value and the output value satisfies a predetermined condition, and a recorder that records the input value and the output value if at least one of the input value and the output value satisfies the predetermined condition.

14 Claims, 8 Drawing Sheets

CALIBRATION WORK SUPPORT DEVICE, CALIBRATION WORK SUPPORT METHOD, AND NON-TRANSITORY COMPUTER READABLE STORAGE MEDIUM

BACKGROUND

Technical Fields

The present invention relates to a calibration work support device, a calibration work support method, and a non-transitory computer readable storage medium.

Priority is claimed on Japanese Patent Application No. 2017-098037, filed May 17, 2017, the contents of which are incorporated herein by reference.

Related Art

In the related art, in plants such as industrial plants such as chemical plants, plants that manage and control wellheads such as gas fields or oil fields, or the surroundings thereof, plants that manage and control power generation such as hydraulic power, thermal power, nuclear power, or the like, plants that manage and control renewable power such as solar power, wind power, or the like, plants that manage and control sewage, dams, or the like, factories, or the like (hereinafter collectively referred to as a "plant"), a distributed control system (DCS), a supervisory control and data acquisition (SCADA) system, or the like has been built, and advanced automatic operation thereof has been realized. In DCS and SCADA, field devices, such as a measuring device or an operating device, and a control device that controls the field devices are connected via a communication means.

In such a control system it is possible to maintain soundness indicating that an operation or accuracy of the field devices is normal by calibrating and adjusting the field devices installed in the plant. Calibration work for a field device is performed, for example, by inputting a simulated input (simulation signal) in which an operation state of the field device is assumed, to a field device that is a calibration target and confirming whether or not an output value corresponding to a value (magnitude) of the simulation signal is in an allowable range determined in an operation situation or how much the output signal deviates from the allowable range.

The value of the simulation signal is determined by the field device that is a calibration target in advance. The value of the simulation signal includes, for example, five points including a lower limit value and an upper limit value of a measurement range. A worker who performs the calibration work adjusts the value of the simulation signal to a predetermined value and records an output value with respect to the adjusted input value. The adjustment of the input value is performed, for example, by operating a manual pump that generates a pressure. The worker adjusts the amount of operation of the manual pump so that the pressure has a predetermined input value while visually confirming a numerical value displayed on a calibrator that measures the pressure (see, for example, Japanese Unexamined Patent Application Publication No. 2014-238361).

However, a proficiency may be required to adjust the simulation signal to be a predetermined value (prescribed value), and it is difficult to adjust it if the worker is not skillful. Moreover, if the adjustment is failed and an output value which is not the prescribed value is recorded, the calibration is not performed accurately. Furthermore, the time until the output value becomes stable with respect to the input value is different due to structure and characteristics of an electronic circuit (including a sensor detecting pressure or the like) of a device that is a calibration target. Therefore, after changing the input value, if the output value is measured before the time sufficient for stabilizing the output value does not elapse, the calibration accuracy may be worse.

On the other hand, after changing the input value, if the output value is measured after waiting unnecessarily for a long time for stabilizing the output value, the work efficiency may be worse because a long time is required for the calibration work. Therefore, the calibration accuracy and the work efficiency may be varied in accordance with the skill of the maintenance worker.

SUMMARY

A calibration work support device may include a calibration target setter configured to set a target value of a simulation signal that is input to a device in calibration of the device, a simulation signal acquirer configured to acquire an input value based on the simulation signal input to the device, a proper range determiner configured to determine whether or not the input value acquired by the simulation signal acquirer is within a proper range for the target value set by the calibration target setter, a proper range notifier configured to notify a user whether or not the input value is within the proper range, an output value acquirer configured to acquire an output value that is output from the device in accordance with the simulation signal that is input to the device, a condition determiner configured to determine whether or not at least one of the input value acquired by the simulation signal acquirer and the output value acquired by the output value acquirer satisfies a predetermined condition, and a recorder configured to record the input value and the output value if the condition determiner has determined that at least one of the input value and the output value satisfies the predetermined condition.

Further features and aspects of the present disclosure will become apparent from the following detailed description of exemplary embodiments with reference to the attached drawings.

DETAILED DESCRIPTION OF THE EMBODIMENTS

The embodiments of the present invention will be now described herein with reference to illustrative preferred embodiments. Those skilled in the art will recognize that many alternative preferred embodiments can be accomplished using the teaching of the present invention and that the present invention is not limited to the preferred embodiments illustrated herein for explanatory purposes.

An aspect of the present invention is to provide a calibration work support device, a calibration work support method, and a non-transitory computer readable storage medium in which calibration accuracy and work efficiency are able to be improved.

Hereinafter, a calibration work support device, a calibration work support method, a calibration work support program, and a recording medium according to an embodiment of the present invention will be described in detail with reference to the drawings.

Figure 1:
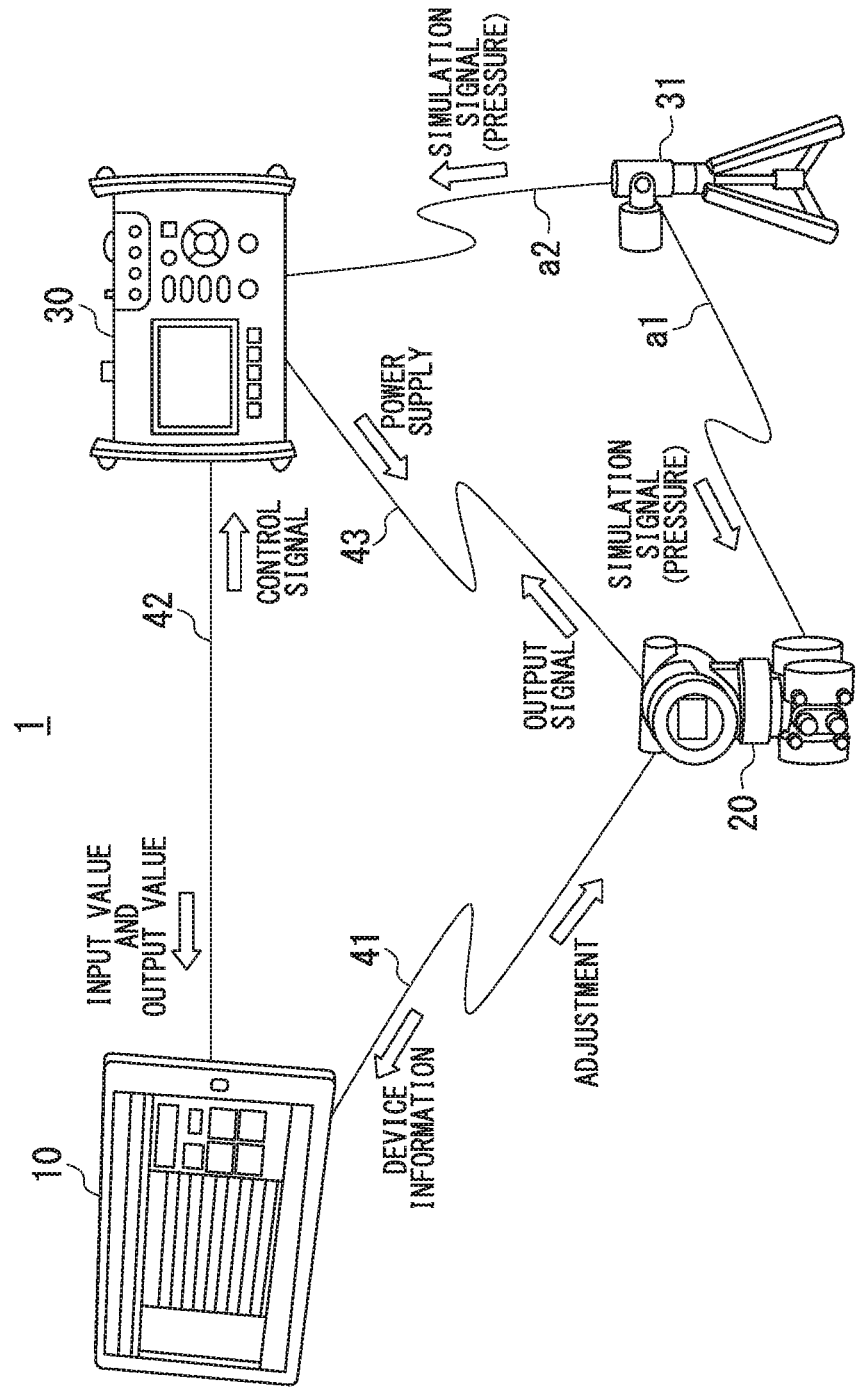
FIG. 1 is a block diagram illustrating an example of a configuration of a calibration work support system including a calibration work support device in an embodiment.

First, a configuration of the calibration work support system be described with reference to FIG. 1. FIG. 1 is a block diagram illustrating an example of a configuration of a calibration work support system including a calibration work support device according to the embodiment.

In FIG. 1, the calibration work support system 1 includes a calibration work support device 10, a pressure gauge 20, a pressure calibrator 30, and a pressure generator 31. The calibration work support device 10 is connected to the pressure gauge 20 via a cable 41. The calibration work support device 10 is connected to the pressure calibrator 30 via a cable 42. The pressure gauge 20 is connected to the pressure calibrator 30 via a cable 43. The pressure generator 31 and the pressure gauge 20 are connected by an air tube a1. The pressure generator 31 and the pressure calibrator 30 are connected by an air tube a2.

The calibration work support device 10 is a device that supports calibration work of the pressure gauge 20 illustrated as a field device. The pressure gauge 20 is a device which is to be calibrated. First, calibration work of the pressure gauge 20 will be described.

The calibration work is work of calibrating a device, which is performed by a maintenance worker who maintains a field device, and it is possible to confirm he soundness of a field device by performing the calibration work. In the calibration of a device, a simulation signal is input to a device, and it is confirmed whether an error in a value of an output signal (an output value) with respect to the simulation signal is in a predetermined allowable range. A simulation signal with a predetermined value is input to the device. The predetermined value of the simulation signal in the calibration is referred to as a calibration point. In the calibration work, the simulation signal is adjusted to be the calibration point, and the simulation signal and the output value from the device according to the value of the simulation signal are recorded. The calibration is performed at one or a plurality of calibration points. The number of points for the calibration points (the number of calibration points) and the value of the simulation signal are determined by a calibration target device in advance. In the calibration, it is confirmed whether or not an error of the output value at each calibration point is in an allowable range. For example, when there are five points for the calibration points, the error of the output value at each of the five calibration points is confirmed. Note that, setting of calibration points in the calibration work is defined in, for example, JIS C 1803-1995 (General rules for defining expression of the performance of industrial-process measurement and control equipment), or the like. In the calibration work of the pressure gauge 20, the simulation signal uses the pressure (air pressure) generated by the pressure generator 31.

The pressure generator 31 generates a predetermined pressure in accordance with an operation of a maintenance worker. The pressure generator 31 may be, for example, a hand pump that generates pressure as a piston is slid by the maintenance worker manually operating a handle. The pressure generated by the pressure generator 31 is input to the pressure gauge 20 as a simulation signal via the air tube a1 and is input to the pressure calibrator 30 via the air tube a2. In the embodiment, it is assumed that the air tube a1 and the air tube a2 have a length and an inner diameter such that a pressure difference in the tube can be neglected. The maintenance worker adjusts the pressure that is generated according to the number of operations of the handle of the manual pump, the amount of operation, or the like, and inputs a predetermined pressure to the pressure gauge 20 as a simulation signal.

The pressure gauge 20 outputs an output value according to the simulation signal (pressure) input from the pressure generator 31, to the pressure calibrator 30 via the cable 43. The pressure gauge 20 outputs an output value (Measure) according to an input pressure (Source) to the pressure calibrator 30. The pressure gauge 20, for example, outputs an output value of an analog current value such as 4 to 20 mA or an analog voltage value of 1 to 5 V in a range of a preset input (pressure).

The pressure calibrator 30 supplies power to the pressure gauge 20, acquires an output value at the calibration point from the pressure gauge 20, and records the output value together with the input value based on the simulation signal. The simulation signal in the calibration of the pressure gauge 20 is a pressure of the simulation signal measured by the pressure calibrator 30 and the input value based on the simulation signal is information indicating the pressure of the simulation signal measured by the pressure calibrator 30. The pressure calibrator 30 can record, for example, an input value (KPA) and an output value (mA) in association with each other.

Further, the pressure calibrator 30 outputs the input value based on the simulation signal (hereinafter, may be called as "input value") and the output value acquired from the pressure gauge 20 (hereinafter, may be called as "output value") to the calibration work support device 10 via the cable 42 in association with each other. The input value based on the simulation signal and the output value acquired from the pressure gauge 20, for example, are synchronously output and associated with each other. The pressure calibrator 30 and the calibration work support device 10, for example, can be connected to each other bi-directionally communicably through serial communication of a predetermined communication standard. The pressure calibrator 30 converts the input value and the output value into a serial signal that is used for communication with the calibration work support device 10 and transmits the serial signal. For example, the pressure calibrator 30 transmits the input value and the output value to the calibration work support device 10 in a predetermined sampling interval (cycle). For example, the pressure calibrator 30 may transmit the input value and the output value based on a timer for measuring the sampling interval, which is disposed in the pressure calibrator 30. Moreover, the pressure calibrator 30 may transmit the input value and the output value based on a request signal transmitted from the calibration work support device 10 in the predetermined sampling interval.

Further, the pressure calibrator 30 may receive a control signal from the calibration work support device 10. The control signal is a signal for controlling an operation of the pressure calibrator 30. The pressure calibrator 30 may receive, from the calibration work support device 10, a control signal equivalent to an operation of a switch or the like included in the pressure calibrator 30. For example, the pressure calibrator 30 includes a switch "Record" for recording the input value and the output value at the calibration point. The pressure calibrator 30 may receive a control signal equivalent to a time when the recording switch has been operated from the calibration work support device 10 through the control signal, and may record the input value and the output value.

In addition, for example, the pressure calibrator 30 may be configured such that the number of calibration points and the ascending or descending pattern of the calibration points may be preset.

The calibration work support device 10 acquires the input value based on the simulation signal and the output value acquired from the pressure gauge 20 in association with each other from the pressure calibrator 30 via the cable 42. The output value may be information representing a current value of an analog current or a voltage value of an analog voltage output from the pressure gauge 20. The calibration work support device 10 supports the calibration work of the pressure gauge 20 based on the acquired input value and the acquired output value. For example, the calibration work support device 10 generates a reference value for calibration that can be compared with the output value, based on the acquired input value. The reference value is an output value serving as a reference when a predetermined pressure is input. The reference value is calculated, for example, from a relational expression illustrating a relationship between a predetermined pressure and an output value. Passing or failing of the calibration of the pressure gauge 20 is determined based on whether a difference (error) between the reference value and the output value acquired from the pressure gauge 20 is in an allowable range. The calibration work support device 10 calculates an error at each calibration point and performs calibration.

Further, the calibration work support device 10 may communicate with the pressure gauge 20, for example, through field communication such as ISA 100, HART (registered trademark), BRAIN (registered trademark), FOUNDATION Fieldbus, or PROFIBUS via the cable 41. The calibration work support device 10 can acquire parameters of the pressure gauge 20 using a command for the field communication. The parameters can include device information such as a device ID of the pressure gauge 20, a tag name, a range of the input value, or a range of the output value. Further, the parameter may include a current value of the output signal, or the like. Further, the calibration work support device 10 may perform a parameter setting or zero-point adjustment of the pressure gauge 20 through the field communication.

Further, the calibration work support device 10 may transmit a control signal to the pressure calibrator 30. For example, the calibration work support device 10 can generate an operation unit equivalent to an operation unit of the pressure calibrator 30 on a touch panel and transmit an operation of the touch panel to the pressure calibrator 30 as a control signal. The calibration work support device 10 may output, for example, an operation for progressing recording of the calibration points in a preset input order as a control signal, in addition to the switch "Record" described above. Note that details of the functions of the calibration work support device 10 will be described below with reference to FIG. 2.

Figure 2:
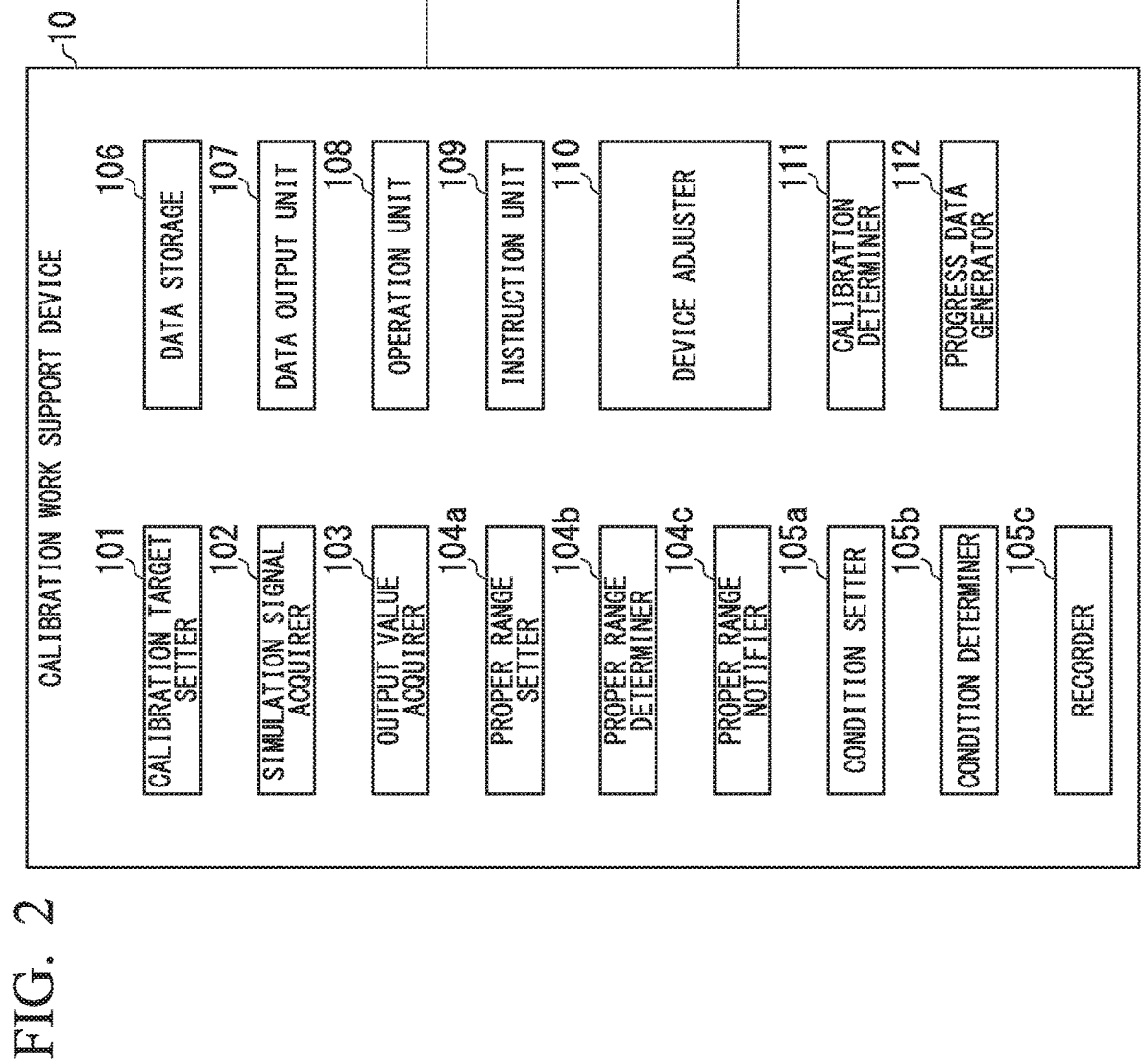
FIG. 2 is a block diagram illustrating an example of a software configuration of the calibration work support device in the embodiment.

Next, a software configuration of the calibration work support device 10 will be described with reference to FIG. 2 FIG. 2 is a block diagram illustrating an example of the software configuration of the calibration work support device 10 according to the embodiment.

In FIG. 2, the calibration work support device 10 includes respective functions of a calibration target setter 101, a simulation signal acquirer 102, an output value acquirer 103, a proper range setter 104a, a proper range determiner 104b, a proper range notifier 104c, a condition setter 105a, a condition determiner 105b, a recorder 105c, a data storage 106, a data output unit 107, an operation unit 108, an instruction unit 109, a device adjuster 110, a calibration determiner 111, and a progress data generator 112. The calibration work support device 10 is communicably connected to the pressure gauge 20. Further, the calibration work support device 10 is communicably connected to the pressure calibrator 30.

The respective functions of the calibration work support device 10 in the embodiment will be described as function modules that are realized by a calibration work support program (software) that controls the calibration work support device 10.

The calibration target setter 101 enables a user to set target values (a calibration point) of the simulation signal that is input to the pressure gauge 20 in the calibration of the pressure gauge 20, and an input order of the target values in the calibration (a recording order of the calibration points).

For example, the calibration target setter 101 can preset the number of calibration points and the ascending or descending pattern of the calibration points. The number of calibration points is a predetermined number necessary for calibration of the device to be calibrated, as described above. In addition, the ascending or descending pattern of the calibration points sets the output signals to be recorded sequentially in ascending order of the calibration points from 0% to 100% (Up), in descending order from 100% to 0% (Down), or back and forth such as from 0%→100%→0% (Up and Down). By determining the number of calibration points and the ascending or descending pattern, a recording order of the output signals at the calibration points is uniquely determined. For example, when the number of calibration points is 1 and ascending or descending pattern is Down, the calibration point is a point at which the input value is 100%. Also, when there are 5 calibration points and the ascending or descending pattern is Up/Down, the calibration points are points in the input value order of 0%→50%→100%→50%→0%.

The number of calibration points may be set by designating the type of the target value. For example, if the target values are three types of 0%, 50%, and 100%, the number of calibration points may be designated as three. The calibration points and a recording order of the calibration points may be hereinafter referred to as "calibration point information".

The calibration point information set by the calibration target setter 101 may be shared with the pressure calibrator 30. For example, the calibration target setter 101 may read the calibration point information set by the pressure calibrator 30 from the pressure calibrator 30, and may set the calibration point information. Moreover, the calibration target setter 101 may provide the calibration point information set by the calibration target setter 101 to the pressure calibrator 30. By sharing the calibration point information with the pressure calibrator 30, it possible to reduce the man-hour for setting the calibration point information.

In the present embodiment, the "user" is a user of the calibration work support device 10. For example, the "user" is an operator who performs calibration work. Moreover, "enabling to set" means to provide the user with a UI (User Interface) for setting. For example, the calibration target setter 101 displays, on the display, a display screen for setting the calibration point information, and enables to set by inputting or selecting the calibration point information by the user. The user may include a person who supports the calibration work, a person who supervises the calibration work, a person who maintains the field device based on the calibration result, or the like.

The simulation signal acquirer 102 acquires the input value based on the simulation signal from the pressure calibrator 30. The output value acquirer 103 acquires, from the pressure calibrator 30, an output value that is output from the pressure gauge 20 according to the simulation signal input to the pressure gauge 20. The pressure calibrator 30 acquires the input value and the output value, converts them into serial signals, and transmits them to the calibration work support device 10. That is, the simulation signal acquirer 102 acquires an input value included in the serial signal, and the output value acquirer 103 acquires an output value included in the serial signal. In the present embodiment, since the input value and the output value are acquired simultaneously (synchronously) in the serial signal, the simulation signal acquirer 102 and the output value acquirer 103, for example, may be combined into one functional unit.

For example, the simulation signal acquirer 102 and the output value acquirer 103 acquire input values and output values at a predetermined sampling interval respectively. The sampling interval may be changed in accordance with the calibration target device. For example, if high air pressure is used as the simulation signal, it takes a long time for the maintenance worker to manually operate the pressure generator 31 to generate high pressure. In this case, the sampling interval can be changed to be longer. Further, the sampling interval may be changed in accordance with the change amount of the input value.

The simulation signal acquirer 102 and the output value acquirer 103 display the acquired input value and the acquired output value on the touch panela the data output unit 107. The input value and the output value acquired at the sampling interval are displayed on the touch panel as display data for displaying a graph in the data output unit 107.

The method of acquiring the input value and the output value is not limited to the above-described method. For example, the simulation signal acquirer 102 may directly acquire the simulation signal from the pressure generator 31 without passing through the pressure calibrator 30. Further, the output value acquirer 103 may acquire the output value directly from the pressure gauge 20 without passing through the pressure calibrator 30.

The proper range setter 104a enables to preset a proper range for the target value (calibration point) of the simulation signal in at least one of the upper limit value and the lower limit value of the input value. The proper range for the calibration point is a magnitude of an error of the input value of the simulation signal, which is allowed in the calibration. In the calibration work, when the input value is in the proper range at the calibration point, it is determined whether the calibration is passing or failing. The maintenance worker performing the calibration work manually operates the pressure generator 31 to adjust an operation amount in order to make the pressure of the simulation signal within the proper range.

For example, the proper range can be set within a range from the upper limit value of the input value to the lower limit value of the input value. For example, if the target value of the simulation signal is 28.330 KPA, the upper limit value is set as 28.660 KPA and the lower limit value is set as 28.000 KPA in order to set the proper range as a range from 28.000 KPA to 28.660 KPA. For example, the upper limit value and the lower limit value may be set by the magnitude of the error centered on the target value. For example, if the error is set as ±0.330 KPA for the target value of 28.330 KPA, similarly, the upper limit value set as 28.660 KPA and the lower limit value is set as 28.000 KPA.

The proper range setter 104a may be able to set different values for a difference between the target value and the upper limit value and a difference between the target value and the lower limit value. For example, the proper range setter 104a may set the upper limit value as 28.550 KPA, and may set the lower limit value as 28.000 KPA, for the target value 28.330 KPA. Moreover, the proper range setter 104a may be able to set only the upper limit value or the lower limit value with respect to the target value. For example, if the target value s the input value of 0%, only the upper limit value may be set for the target value. Further, if the target value is the input value of 100%, only the lower limit value may be set for the target value.

The proper range determiner 104b determines whether the input value of the simulation signal acquired by the simulation signal acquirer 102 is within the proper range for the target value set by the proper range setter 104a. For example, the input value is acquired at a predetermined sampling interval. The proper range determiner 104b determines whether or not the input value acquired at the sampling interval has been within the proper range. In order to cancel an influence due to noise, for example, if input values of a predetermined, sampling number are continuously within the proper range, the proper range determiner 104b may determine that the input value has been within the proper range.

The proper range notifier 104c notifies the user whether or not the input value acquired by the simulation signal acquirer 102 is within the proper range. Whether or not the input value is within the proper range is determined by the proper range determiner 104b. The notification representing whether or not the input value is within the proper range s one of a notification representing only that the input value is within the proper range, a notification representing only that the input value is not within the proper range, and both of a notification representing that the input value is within the proper range and a notification representing that the input value is not within the proper range. When it is determined that the input value is within the proper range, the proper range notifier 104c notifies the user of information representing that the simulation signal is within the proper range by displaying characters or the like. The user can interrupt the operation of the pressure generator 31 at an appropriate timing based on the information notified by the proper range notifier 104c. For example, the proper range notifier 104c may notify the information representing that the simulation signal is within the proper range by changing a display mode, such as color, font, and background of a numerical value of the input value.

The condition setter 105a enables to preset a condition for recording the input value acquired by the simulation signal acquirer 102 or the output value acquired by the output value acquirer 103. The recorded input value and output value are used as data for determining passing or failing of the calibration. That is, the condition set by the condition setter 105a is a condition for determining whether the input value or the output value is suitable as data for determining passing or failing of the calibration. For example, the condition setter 105a sets conditions for both the input value and the output value. However, the condition setter 105a may set a condition only for the input value. Further, the condition setter 105a may set a condition only for the output value.

The condition setter 105a enables to set one or more conditions for one calibration point. The condition setter 105a may be able to set an arbitrary number of conditions for one calibration point. Further, when setting a plurality of conditions, the condition setter 105a may be able to set a determination order of the set conditions. For example, if a work procedure for the maintenance worker to check the input value or the output value is determined in the calibration work, the condition setter 105a sets the conditions to be determined in the order according to the work procedure. Further, the condition setter 105a may be able to set a determination algorithm for the input value or the output value. For example, the condition setter 105a may be able to set the algorithm in order to determine only one of conditions B and C in accordance with the determination result of the condition A. For example, the condition setter 105a presets check items of the input value or output value, which is performed by a skilled worker in the calibration work. Thereby, the calibration accuracy and the work efficiency can be improved irrespective of the skill level of the worker.

For example, the condition setter 105a can set a condition representing that the input value is within the proper range for more than the predetermined time. The condition setter 105a may set a condition representing that the input value is within a range narrower than the proper range for more than the predetermined time. The predetermined time may be set as an arbitrary time. Further, the condition setter 105a may set a condition representing that the input value or the output value is stable. Specific conditions for determining whether or not the input value or the output value is stable will be described later with reference to drawings.

The condition determiner 105b determines, at each calibration point, whether at least one of the acquired input value or the acquired output value satisfies the condition set by the condition setter 105a. For example, if a plurality of conditions is set, the condition determiner 105b determines for each condition. In addition to determining whether the input value or the output value satisfies the condition, for example, the condition determiner 105b may determine the state of the input value or the output value until the condition is satisfied. For example, if a condition representing that the input value is within the proper range for ten seconds or more is set, the condition determiner 105b may determine remaining seconds until the condition is satisfied.

If the condition determiner 105b has determined that the condition is satisfied, the recorder 105c records the input value and the output value at the respective calibration points. If a plurality of conditions is set, the recorder 105c records the input value and the output value when the condition determiner 105b has determined that all the conditions are satisfied. The recorded input value and the recorded output value are used as data for determining passing or failing of the calibration.

The data storage 106 stores data. For example, the data storage 106 stores information (data), such as the target value set by the calibration target setter 101, the input order set by the calibration target setter 101, the input value based on the simulation signal acquired in the simulation signal acquirer 102, the output value acquired in the output value acquirer 103, the proper range set by the proper range setter 104a, the determination result determined by the proper range determiner 104b, the notification contents notified by the proper range notifier 104c, the condition (which may include an algorithm) set by the condition setter 105a, the determination result determined by the condition determiner 105b, the record contents recorded in the recorder 105c, the determination result determined by the calibration determiner 111, the progress data generated by the progress data generator 112, and so on. The data storage 106 may store the above-described data as a calibration history combined with the information of the device. The calibration history may include, for example, information such as a performance date and time of the calibration work, the maintenance worker, a result of the calibration, an action performed or scheduled to be performed, a memo of the maintenance worker, and an image captured by a camera. Note that the information on the device can be acquired by, for example, the device adjuster 110 to be described below. The information on the device may include a manual input of the maintenance worker, reading information of a two-dimensional code attached to the device, and the like. By storing the information on the device together, it is possible to facilitate use of the stored data. For example, it is possible to search for the stored data using a device ID and analyze data for a device specified using the device ID that has been searched for.

The data output unit 107 outputs the data stored in the data storage 106 to the outside of the calibration work support device 10. For example, the data output unit 107 outputs the stored data as display data for displaying on the display device. Further, the data output unit 107 may output print data for outputting the stored data to a printer, transmission data for transmitting the stored data to another computer via a communication line, and so on. For example, the data output unit 107 may output the calibration history stored in the data storage 106 as a report in a predetermined format.

The operation unit 108 provides the user with a UI and enables operations for the calibration work support device 10. For example, the operation unit 108 displays a switch on the touch panel and enables the user to press the switch. For example, the operation unit 108 displays, on the touch panel, a switch for starting the calibration, a switch for switching display screens, a switch for manually recording the input values and the output values. The operation unit 108 may detect operation of a hard key.

The instruction unit 109 transmits a control signal to the pressure calibrator 30. For example, the instruction unit 109 may transmit the control signal equivalent to an operation of a switch in the pressure calibrator 30 to control the operation of the pressure calibrator 30.

The device adjuster 110 has a function of adjusting and setting the pressure gauge 20 illustrated as a field device. For example, the device adjuster 110 can read a device information (parameter) set in the pressure gauge 20 and change the device information set in the pressure gauge 20 or set the device information in the pressure gauge 20. The device adjuster 110 may have a function of recording the device information of the pressure gauge 20. Further, the device adjuster 110 may have a function of supporting an input loop test, a function of adjusting a zero point, a function of creating a report, and the like. By having the functions of the device adjuster 110, the calibration work support device 10 can perform adjustment or setting of the field device and calibration work of the field device and improve workability. For example, the device adjuster 110 may adjust the zero point of the field device on the basis of a result of the calibration performed in the pressure calibrator 30. By using the calibration result for the adjustment of the zero point of the field device, it is possible to reduce the number of adjustments. By having the function of the device adjuster 110, the calibration work support device 10 can improve the work efficiency of the calibration work and improve the work efficiency of the adjustment work.

The calibration determiner 111 makes a determination as to the calibration. The calibration determiner 111 determines whether or not the error of the output value is within a predetermined range based on the input value and the output value at the calibration point, which are recorded in the recorder 105c. For example, the calibration determiner 111 generates, based on the acquired input value, a calibration reference value that can be compared with the output value. The reference value is an output value serving as a reference when a predetermined pressure is input. The calibration determiner 111 determines whether or not a difference (error) between the generated reference value and the acquired output value is in the allowable range. When the calibration determiner 111 determines that the calculated difference is in the allowable range, the calibration determiner 111 generates the determination result "PASS" at the calibration point. On the other hand, when the calibration determiner 111 determines that the calculated difference is not in the allowable range, the calibration determiner 111 generates the determination result "FAIL" at the calibration point. For example, when the determination result "PASS" is generated at all the calibration points, the calibration determiner 111 may generate the determination result that the calibration is passed. When a magnitude of the error in the allowable range is preset, the calibration determiner 111 may acquire the set allowable range and generate the determination result.

Note that the determination result generated by the calibration determiner 111 may be reflected in the progress data generated by the progress data generator 112. For example, the progress data may include the determination result "PASS" or "FAIL". Further, the determination result generated by the calibration determiner 111 may be stored in the data storage 106 or may be output from the data output unit 107.

The progress data generator 112 generates progress data indicating a progress status of the calibration in the input order of the calibration points set by the calibration target setter 101. The progress data generator 112 generates the progress data in a list format of an input schedule and an input result of the simulation signal. For example, if the calibration points are set in the order of 0%→50%→100%→50%→0%, the progress data generator 112 generates the input schedule of the simulation signal in the list form, and sequentially updates the recorded input results. That is, the progress data generator 112 generates display data for visually recognizing which calibration point the calibration is completed. For example, the progress data generator 112 displays the output value at the calibration point which has been recorded at each calibration point. Thereby, the maintenance worker can visually recognize the calibration point on which the output value is not displayed, and can recognize the progress of the calibration.

The display data displayed on the display screen in the calibration work support device 10 is output from the data output unit 107, but the data output unit 107 may generate, for example, display data of a graph indicating transition of the input value and the output value included in the display data. The data output unit 107 generates a graph in which the horizontal axis represents the time when the input value and the output value are acquired and the vertical axis represents the input value and the output value (%). For example, if the input value based on the simulation signal increases due to the operation of the maintenance worker, the data output unit 107 generates a graph indicating the increase of the input value and the output value. The graph shows an amount by which the maintenance worker increases or decreases the simulation signal and the output value which changes in accordance with the change of the input value. For example, if the maintenance worker rapidly increases or decreases the simulation signal, the inclination of the graph becomes large. On the other hand, if the maintenance worker slowly increases or decreases the simulation signal, the inclination of the graph becomes small. The output value follows the increase or decrease of the input value with delay. The output value is delayed and stabilized after the input value becomes stable. By viewing the generated graph, the maintenance worker can visually recognize the difference between the input value and the output value, and temporal transition until the output value becomes stable in accordance with the increase or decrease of the input value. For example, the target value set by the calibration target setter 101 is generated as a horizontal line indicating a predetermined input value on the graph. The target value set by the calibration target setter 101 changes in accordance with the recording order of the calibration points as described above. For example, if the target value of the calibration point is set in the order of 0%→50%→100%→50%→0%, it may be displayed visually in the graph whether recording of the input value and the output value at each calibration point has been completed or not.

Further, the case in which one calibration work support device 10 is connected to each one of the pressure gauge 20 and the pressure calibrator 30 has been illustrated in FIG. 2, but the number of connected pressure gauges 20 or pressure calibrators 30 connected to the calibration work support device 10 is arbitrary.

Further, the functions of the calibration target setter 101, the simulation signal acquirer 102, the output value acquirer 103, the proper range setter 104a, the proper range determiner 104b, the proper range notifier 104c, the condition setter 105a, the condition determiner 105b, the recorder 105e, the data storage 106, the data output unit 107, the operation unit 108, the instruction unit 109, the device adjuster 110, the calibration determiner 111, and the progress data generator 112 included in the calibration work support device 10 are realized by software as described above. However, at least one of the functions of the calibration work support device 10 may be realized by hardware.

Further, any of the functions of the calibration work support device 10 may be implemented by dividing one function into a plurality of functions. Further, any two or more of the functions of the calibration work support device 10 may be integrated into one function and implemented.

Further, the calibration work support device 10 may be a device that is realized with one casing or may be a system that is realized from a plurality of devices connected via a network or the like. For example, the calibration work support device 10 may be a virtual device such as a cloud service that is provided by a cloud computing system.

Further, the calibration work support device 10 may be a general-purpose computer such as a server device or may be a dedicated device with limited functions.

Further, at least one of the above-described functions of the calibration work support device 10 may be realized in another device. That is, the calibration work support device 10 need not have all of the above functions and may have some of the functions.

Figure 3:
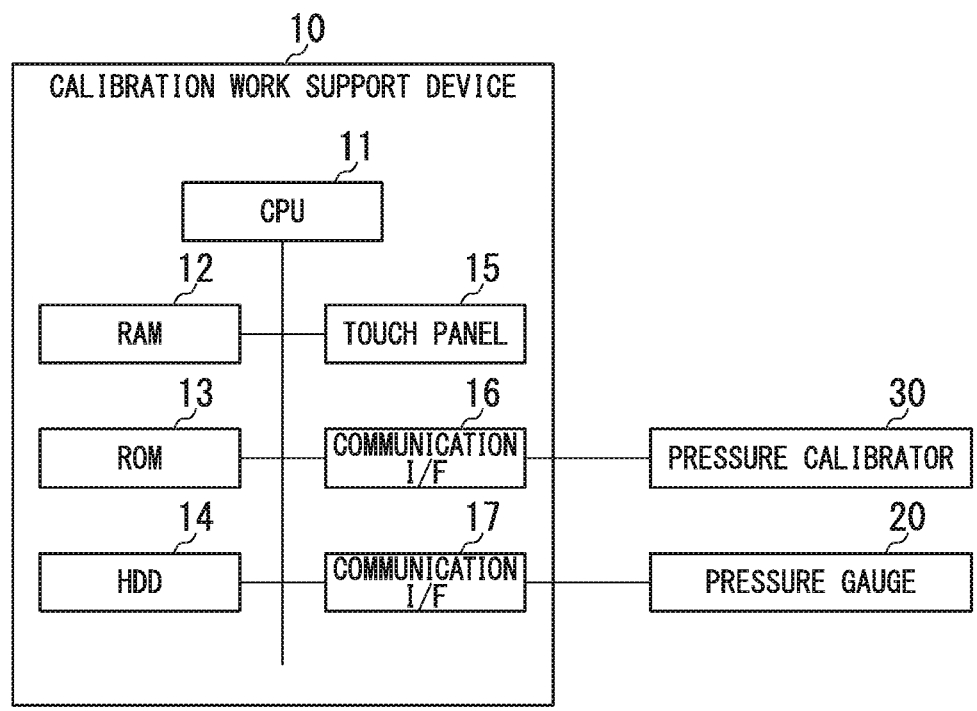
FIG. 3 is a block diagram illustrating an example of a hardware configuration of the calibration work support device in the embodiment.

Next, a hardware configuration of the calibration work support device 10 will be described with reference to FIG. 3. FIG. 3 is a block diagram illustrating an example of the hardware configuration of the calibration work support device 10 according to the embodiment.

The calibration work support device 10 includes a central processing unit (CPU) 11, a random access memory (RAM) 12, a read only memory (ROM) 13, a hard disk drive (HDD) 14, a touch panel 15, a communication interface (I/F), and a communication I/F 17.

The calibration work support device 10 is a general-purpose device such as a server device, a desktop type PC or a tablet type PC, or a device dedicated to calibration work support. The calibration work support device 10 executes the calibration work support program described with reference to FIG. 2.

The CPU 11 controls the calibration work support vice 10 by executing the calibration work support program stored in the RAM 12, the ROM 13, or the HDD 14. The calibration work support program is acquired, for example, from a recording medium on which the calibration work support program is recorded or from a program distribution server via the network, installed in the HDD 14, and stored in the RAM 12 so that the calibration work support program can be read from the CPU 11.

The touch panel 15 has an operation display function having an operation input function and a display function. The touch panel 15 enables an operator to input an operation using a fingertip, a touch pen, or the like. Although the case in which the calibration work support device 10 uses the touch panel 15 having the operation display function will be described in the embodiment, the calibration work support device 10 may individually have a display device having a display function and an operation input device having an operation input function. In this case, a display screen of the touch panel 15 can be implemented as a display screen of a display device, and an operation of the touch panel 15 can be implemented as an operation of the operation input device. Note that the touch panel 15 may be realized in various forms such as a head mount type, glasses type, or wristwatch type display. Note that the data output unit 107 may output display data to the head mount type, glasses type, or wristwatch type display, or the like.

The communication I/F 16 controls communication with the pressure calibrator 30. The communication I/F 17 controls communication with the pressure gauge 20. The communication I/F 17 controls field communication that is used for communication with the field device, for example.

Figure 4:
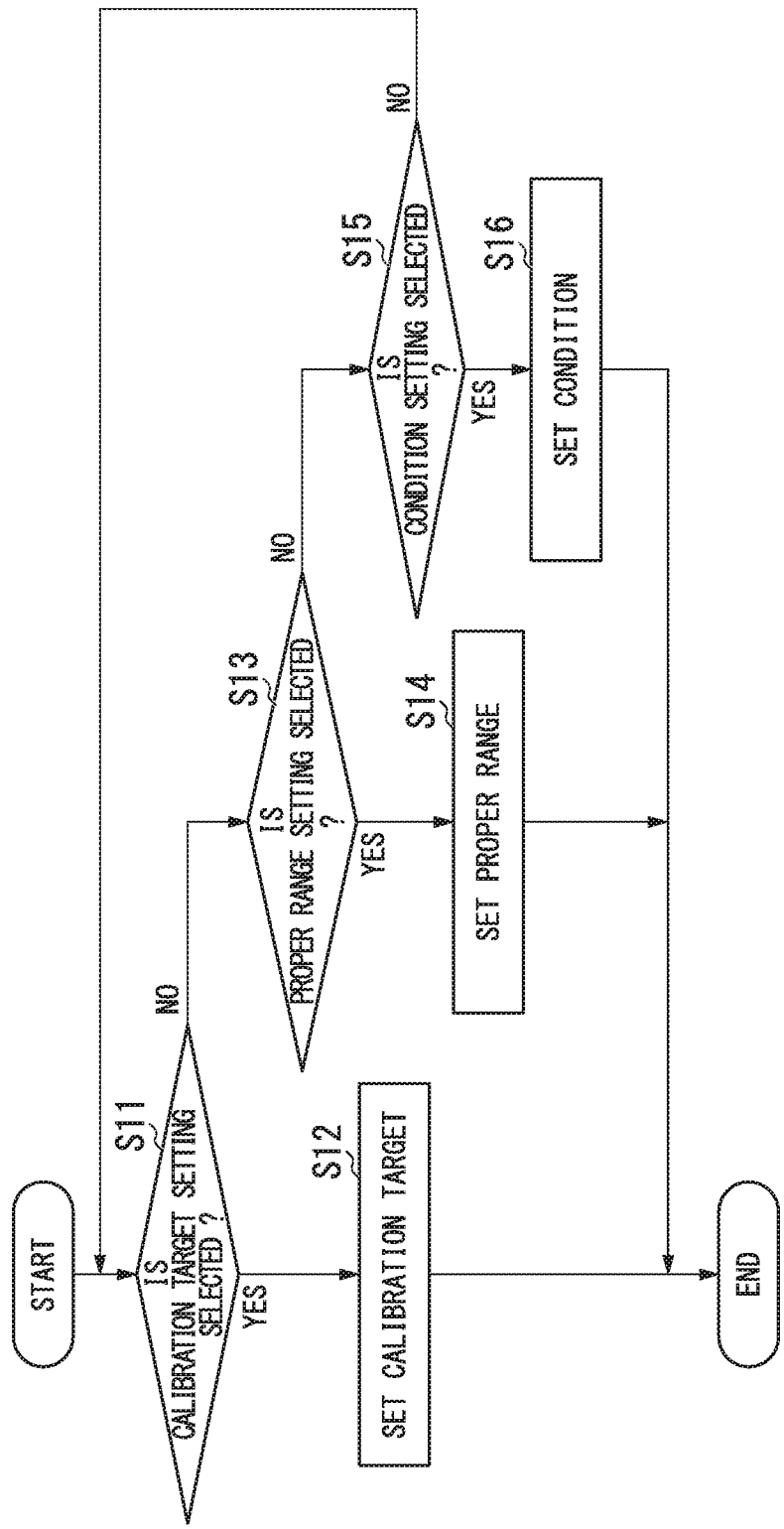
FIG. 4 is a flowchart illustrating an example of a setting operation of the calibration work support device in the embodiment.

Next, a setting operation of the calibration work support device 10 will be described with reference to FIG. 4. FIG. 4 is a flowchart illustrating an example of the setting operation of the calibration work support device 10 according to the embodiment. The setting operation is an operation enabling setting of various parts provided to the user before calibrating. The operation shown in FIG. 4 is executed, for example, when the user perform operation such as switching the mode into a setting mode.

In FIG. 4, the calibration work support device 10 determines whether the calibration target setting has been selected (step S11). For example, the calibration work support device 10 can determine whether the calibration target setting has been selected by detecting that the user presses the selection button of the calibration target setting. If the calibration work support device 10 has determined that the calibration target setting has been selected (step S11: YES), the calibration work support device 10 executes a calibration target setting process (step S12). For example, the calibration target setting process can be executed by the calibration target setter 101 providing the user with a UI for setting the calibration target. For example, the calibration target setting process is ended by storing the setting of the calibration target input by the user.

On the other hand, if the calibration work support device 10 has determined that the calibration target setting has not been selected (step S11: NO), the calibration work support device 10 determines whether the proper range setting has been selected (step S13). For example, the calibration work support device 10 can determine whether the proper range setting has been selected by detecting that the user presses the selection button of the proper range setting. If the calibration work support device 10 has determined that the proper range setting has been selected (step S13: YES), the calibration work support device 10 executes the proper range setting process (step S14). For example, the proper range setting process can be executed by the proper range setter 104a providing the user with a UI for setting the proper range of the input value. For example, the proper range setting process is ended by storing the setting of the proper range input by the user.

On the other hand, if the calibration work support device 10 has determined that the proper range setting has not been selected (step S13: NO), the calibration work support device 10 determines whether the condition setting has been selected (step S15). For example, the calibration work support device 10 can determine whether the condition setting has been selected detecting the user presses the selection button of the condition setting. If the calibration work support device 10 has determined that the condition setting has been selected (step S15: YES), the calibration work support device 10 executes the condition setting process (step S16). For example, the condition setting process can be executed by the condition setter 105a providing the user with a UI for setting at least one of conditions of the input value and the output value. For example, the condition setting process is ended by storing the setting of the conditions input by the user.

On the other hand, if the calibration work support device 10 has determined that the condition setting has not been selected (step S15: NO), the calibration work support device 10 repeats the processes from step S11 to step S15, and waits for any selection. After the process of step S12, the process of step S14, or the process of step S16 is executed, the calibration work support device 10 ends the processing shown in the flowchart. The calibration work support device 10 executes the processing shown in the flowchart so that the user can perform various settings. In the operation shown in FIG. 4, the processing of the setting mode shown in FIG. 4 ends after the processing of step S12, the processing of step S14, or the processing of step S16 is executed. Therefore, for example, if two or more settings of the calibration target, the proper range, and the condition are executed, the user switches the mode to the setting mode again. The two or more settings of the calibration target, the proper range, and the condition may be executed continuously by enabling continuous setting of the setting mode by the user's operation.

Figure 5:
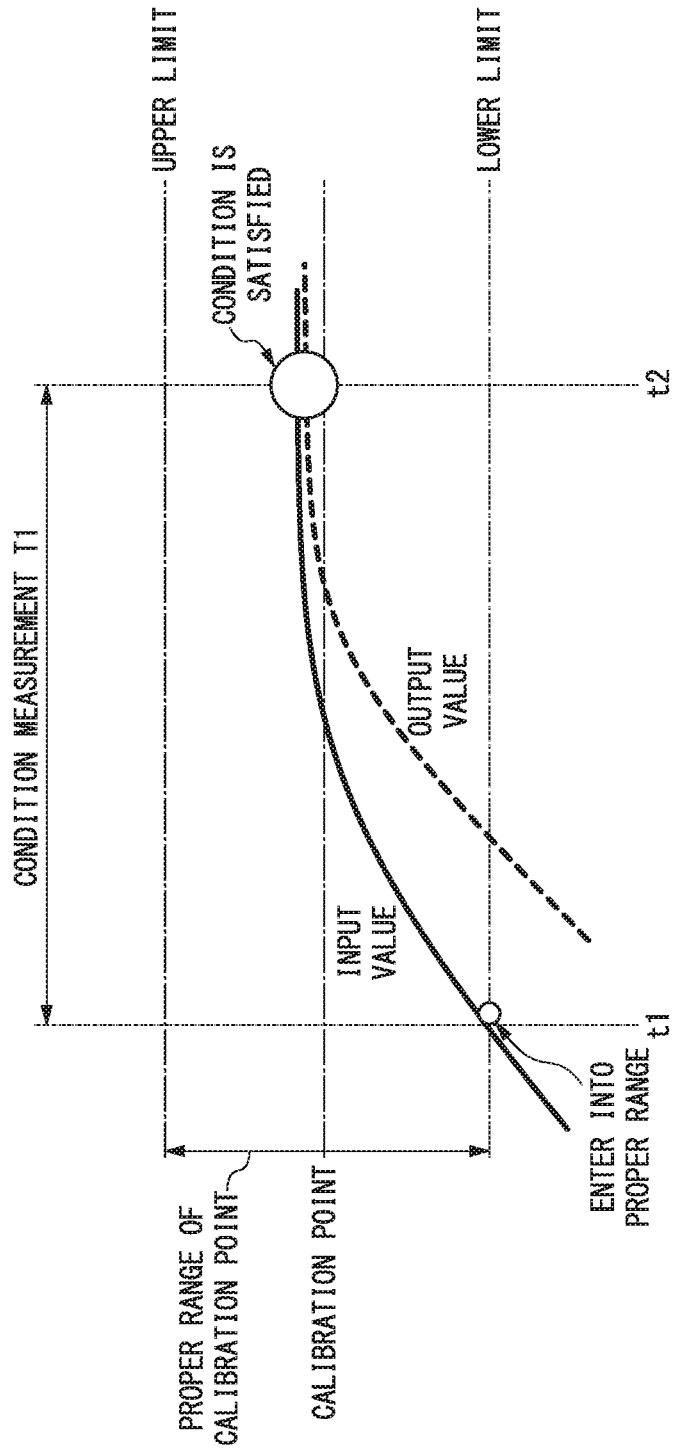
FIG. 5 is a diagram illustrating an example of transition of input values and output values of the calibration work support device in the embodiment.

Next, with reference to FIG. 5, an example of the proper range set in step S14 of FIG. 4 and the condition set in step S16 will be described. FIG. 5 is a diagram illustrating an example of transition of input values and output values of the calibration work support device 10 in the embodiment In FIG. 5, the horizontal axis represents time, and the vertical axis represents the input value and the output value. The calibration point is the target value of the input value. For the calibration point, a proper range set by the lower limit value and the upper limit value is preset (process of step S14). A maintenance worker performing the calibration work operates the pressure generator 31 to raise the input value (solid line), so that the input value exceeds the lower limit value at the time t1 and enters into the proper range. When the input value enters into the proper range, the proper range determiner 104b performs the decision, and the proper range notifier 104c performs the notification. When the maintenance worker is notified that it enters into the proper range, the maintenance worker adjusts the operation amount of the pressure generator 31 to stabilize the input value within the proper range.

On the other hand, the condition determiner 105b determines that the input value has entered into the proper range, and counts the time during which the input value is within the proper range from time t1. The time T1 is a condition of time during which the input value is within the proper range. That is, at the time t2 when the time T1 has elapsed from the time t1, the condition is satisfied. The output value (broken line) rises with a delay with respect to the rise of the input value. At the time t1, the output value is not yet stable, and it is separated from the input value. On the other hand, the output value is stable at the time t2 when the condition is satisfied. When the condition determiner 105b determines that the time t2 has reached t1+T1, the recorder 105c records the input value and the output value at the time t2. The calibration determiner 111 calculates a reference value based on the input value recorded at the time t2, and determines whether the calibration is passing failing based on whether the difference between the reference value and the output value is within a predetermined range.

FIG. 5 shows an example of the condition set by the condition setter 105a, and the condition set by the condition setter 105a is not limited thereto. Other conditions set by the condition setter 105a will be described with reference to FIG. 6.

Figure 6:
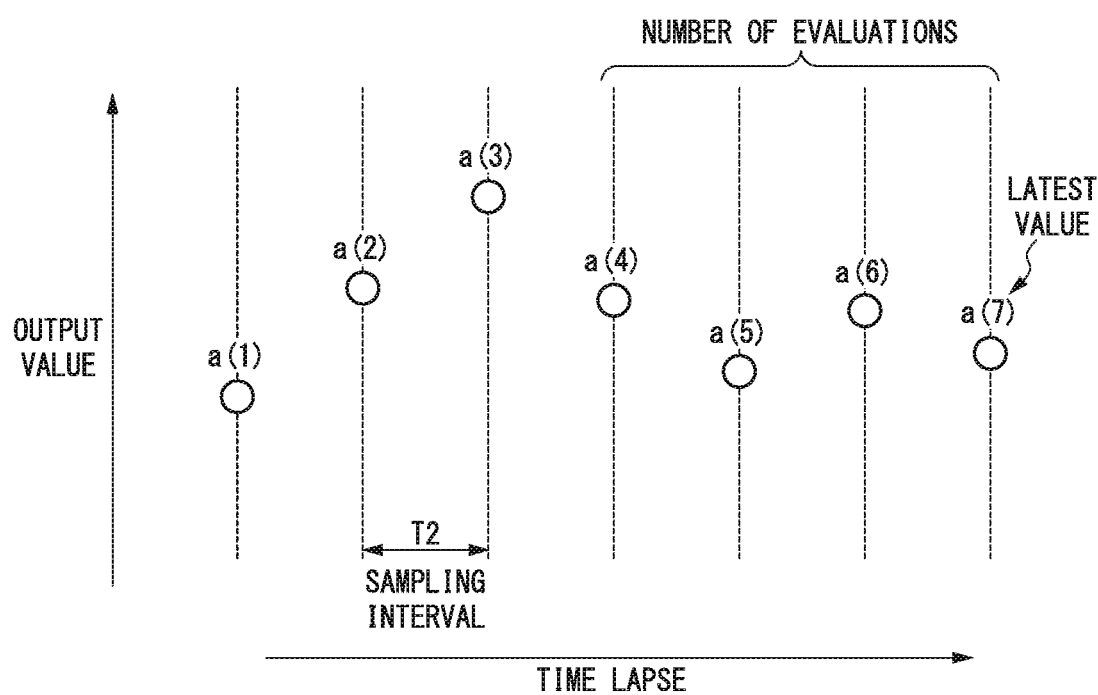
FIG. 6 is a diagram illustrating an example of stability of input values or output values of the calibration work support device in the embodiment.

Next, an example of other conditions set in step S16 will be described with reference to FIG. 6. FIG. 6 is a diagram illustrating an example of stability of input values or output values of the calibration work support device 10 in the embodiment. That is, FIG. 6 is a drawing for explaining a case where a stability of the input value or the output value is set as the condition. The horizontal axis represents passage of time, and the vertical axis represents the input value or the output value. In the following description, a case of determining the stability of the output value will be described.

[First Method]

In FIG. 6, the output value a (n) is measured after the input value is stabilized. The output value is obtained at the sampling interval T2 in synchronization with the input value. The output value is acquired for each T2 from a (1) with the lapse of time, and a (7) is the latest value of the output value. Here, the change amount D of the output value is represented by the formula (1).

$$D = \sigma/(s-1) \quad (1)$$

Here, $\sigma$ is a sum of change amounts, and s is a number of evaluations.

The sum $\sigma$ of the change amounts is represented by the formula (2).

$$\sigma = |a(n)-a(n-1)| + |a(n-1)-a(n-2)| + \ldots + |a(n-s)-a(n-s-1)| \quad (2)$$

The number of evaluations s is a number of the output values of evaluation targets used for determining the condition. If the number of evaluations s=4, the evaluation targets are a (4) to a (7) which are four new output values from the latest value a (7) shown in FIG. 6. In a case that s=4, the change amount D is represented by the formula (3).

$$D = \{|a(7)-a(6)| + |a(6)-a(5)| + |a(5)-a(4)|\}/3 \quad (3)$$

That is, if the condition setter 105a sets the number of evaluations s=4, the condition determiner 105b determines that the condition is satisfied when the magnitude of the change amount D represented by the formula (3) is smaller than the value set by the condition setter 105a. The value set for the input value by the condition setter 105a may be different from the value set for the output value by the condition setter 105a. The satisfaction of the stability condition is not limited to the method using the formula (1) in the first method, and the number of evaluations is not limited to four. For example, the change amount may be calculated in accordance with a root mean square of a difference between a previous output value and a next output value. The condition setter 105a may select one calculation formula from a plurality of calculation formulas to calculate the change amount. Further, the condition setter 105a may calculate the stability of the output value and the stability of the input value by using different formulas.

[Second Method]

If the latest output value is an output value a (i) (i is an integer), an average value $\theta$ of all the number of evaluations s of the output value acquired before a (i) is calculated. Thereafter, it is determined that the stability condition is satisfied if the magnitude of the differential value E(i) calculated in accordance with the following formula (4) is within a predetermined range at all the output values a (i).

$$E(i) = |a(i) - \theta| \quad (4)$$

For example, if the number of evaluations s=10, the average value $\theta$ is calculated for the output values a (1) to a (10). Here, the differential values E (i) are calculated for all the output values a (i). Specifically, if all of the differential values E (i)=|a(i)-$\theta$| (i=1 to 10) are within the predetermined range, it is determined that the stability condition is satisfied.

By using the second method, for example, it is possible to obtain a determination result different from the first method concerning the change of the output value as follows. In a case that the number of evaluations s=10, the stabilities of the case 1 and the case 2 are determined.

Case 1: a (1)=1, a (2)=2, a (3)=1, a (4)=2, a (5)=1, a (6)=2, a (7)=1, a (8)=2, a (9)=1, a (10)=2

Case 2: a (1)=1, a (2)=1, a (3)=1, a (4)=1, a (5)=1, a (6)=1, a (7)=1, a (8)=1, a (9)=1, a (10)=10

In the first method, in the formula (1):

Case 1: $D = 9/(10-1) = 1$

Case 2: $D = 9/(10-1) = 1$

In both the case 1 and the case 2, the change amount is calculated as D=1, and the determination result of the case 1 is the same as the determination result of the case 2. For example, if the stability condition represents that $D \leq 1$, it is determined that both the cases are stable.

On the other hand, in the second method, differential values E (i) are calculated for all of the ten output values in accordance with the formula (4). Here, if the stability condition represents that the differential value E<1, the differential values E (i) for the output values a (1) to a (9) are within the predetermined range. However, the differential value E(10) for the output value a (10) is calculated as follows.

Case 1: $E(10)=|2-15/10|=0.5$

Case 2: $E(10)=|10-10/10|=8.1$

Therefore, the case 1 is determined that the differential value E (10) is within the predetermined range and the stability condition is satisfied. On the other hand, the case 2 is determined that the differential value E (10) is not within the predetermined range and the stability condition is not satisfied.

In the case 2, the output value a (10)=10 changes significantly with respect to the output values a (1) to a (9), and it is not stable. Therefore, even if it is determined that it is stable by the first method, it can be determined that it is not stable by the second method. For this reason, in the case 2, the stability can be determined more appropriately.

Only one of the first method and the second method may be used for determining the stability condition. Moreover, if it is determined that the condition is satisfied in accordance with the first method and the condition is satisfied in accordance with the second method, it may be determined that the stability condition is satisfied. In the first method and the second method, only the output value is used for determining the stability, but, for example, a temporal element may be used for determining the stability.

Figure 7:
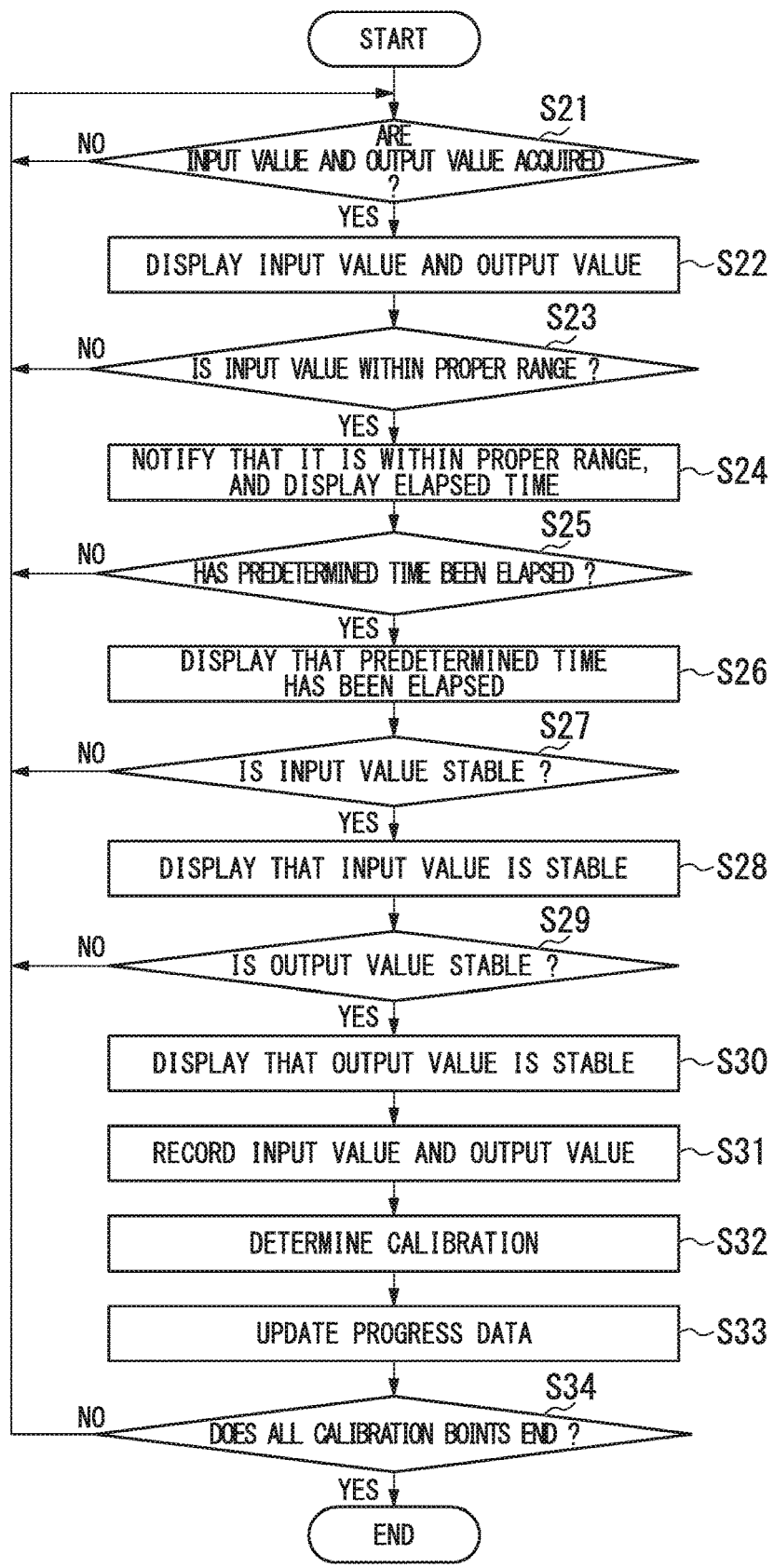
FIG. 7 is a flowchart illustrating an example of calibration work of calibration work support device in the embodiment.

Next, the calibration work of the calibration work support device 10 will be described with reference to FIG. 7. FIG. 7 is a flowchart illustrating an example of calibration work of the calibration work support device in the embodiment.

In FIG. 7, the calibration work support device 10 determines whether or not the input value and the output value have been acquired (step S21). For example, the input value and the output value are acquired at a predetermined sampling interval T2. The calibration work support device 10 can determine whether or not the input value has been acquired, for example, based on whether or not the simulation signal acquirer 102 has acquired the input value. Moreover, the calibration work support device 10 can determine whether or not the output value has been acquired, for example, based on whether or not the output value acquirer 103 has acquired the output value. However, as described above, since the input value and the output value are acquired synchronously from the pressure calibrator 30, the calibration work support device 10 may determine whether or not only the input value or only the output value has been acquired, for example. If the calibration work support device 10 has determined that the input value and the output value have not been acquired (step S21: NO), the calibration work support device 10 repeats the process of step S21 and waits for acquiring the input value and the output value.

On the other hand, if the calibration work support device 10 has determined that the input value and the output value have been acquired (step S21: YES), the calibration work support device 10 displays the acquired input value and the acquired output value (step S22). For example, the data output unit 107 may display the numerical values of the input value and the output value on the touch panel 15. Moreover, the data output unit 107 may generate a graph representing the transition of the input value and the output value, and may display the generated graph on the touch panel 15. Further, for example, the acquired input value and the acquired output value may be temporarily stored in the data storage 106.

After executing the process of step S22, the calibration work support device 10 determines the condition for recording the input value and the output value in the processes from step S23 to step S29.

First, the calibration work support device 10 determines whether or not the input value is within the proper range (step S23). For example, the proper range determiner 104*b* can determine whether or not the input value is within the proper range based on whether or not the input value is within the proper range at the calibration point set by the proper range setter 104*a*. If the calibration work support device 10 has determined that the input value is not within the proper range (step S23: NO), the calibration work support device 10 returns to the process of step S21 and waits until the next input value enters into the proper range.

On the other hand, if the calibration work support device 10 has determined that the input value is within the proper range (step S23: YES), the calibration work support device 10 notifies that the input value is within the proper range, and displays the time elapsed from when the input value entered into the proper range (Step S24). For example, the proper range notifier 104*c* displays that the input value is within the proper range, and displays the elapsed time, on the touch panel 15 via the data output 107. By notifying that the input value is within the proper range, the maintenance worker performing the calibration work can adjust the manual operation of generating the simulation signal to stabilize, and the work efficiency can be improved. Moreover, by displaying the elapsed time, the maintenance worker can grasp the time to retain the input value.

After executing the process of step S24, the calibration work support device 10 determines whether or not a predetermined time has elapsed since the input value entered into the proper range (step S25). For example, the condition determiner 105*b* can determine whether or not the predetermined time has elapsed since the input value entered into the proper range based on the time set by the condition setter 105*a*. If the calibration work support device 10 has determined that the predetermined time has not elapsed since the input value entered into the proper range (step S25: NO), the calibration work support device 10 returns to the process of step S21 and waits until the predetermined time is elapsed since the input value entered into proper range.

On the other hand, if the calibration work support device 10 has determined that the predetermined time has elapsed since the input value entered into the proper range (step S25: YES), the calibration work support device 10 displays that the predetermined time has elapsed and the condition has been satisfied (Step S26). For example, the data output unit 107 may display the determination result of the condition determiner 105*b* on the touch panel 15.

After executing the process of step S26, the calibration work support device 10 determines whether or not the input value is stable (step S27). For example, the condition determiner 105*b* calculates the change amount D in equation (1) and determines the stability to determine whether or not the input value is stable. If the calibration work support device 10 has determined that the input value is not stable (step S27: NO), the calibration work support device 10 returns to the process of step S21 and waits until the input value becomes stable. Since the determination of the stability in the process of step S27 is executed when the input value is within the proper range for the predetermined time in step S25, for example, the stability of the input value which is apart from the calibration point is not a target for determination.

On the other hand, if the calibration work support device 10 has determined that the input value is stable (step S27: YES), the calibration work support device 10 displays that the input value is stable (step S28). For example, the data output unit 107 may display the determination result of the condition determiner 105b on the touch panel 15.

After executing the process of step S28, the calibration work support device 10 determines whether or not the output value is stabile (step S29). For example, the condition determiner 105b calculates the change amount D in the formula (1) and determines the stability to determine whether or not the output value is stable. If the calibration work support device 10 has determined that the output value is not stable (step S29: NO), the calibration work support device 10 returns to the process of step S21 and waits until the output value becomes stable.

On the other hand, if the calibration work support device 10 has determined that the output value is stable (step S29: YES), the calibration work support device 10 displays that the output value is stable (step S30). For example, the data output unit 107 displays the determination result of the condition determiner 105b on the touch panel 15.

After executing the process of step S30, the calibration work support device 10 records the acquired latest input value and the acquired latest output value (step S31). For example, the recorder 105c may store the latest input value and the latest output value in the data storage 106.

After executing the processing of step S31, the calibration work support device 10 determines whether the calibration is passing or failing based on the input value and the output value recorded in step S31 (step S32). For example, the calibration determiner 111 may calculate the reference value based on the input value, and may determine the error (difference) between the reference value and the output value.

After executing the processing of step S32, the calibration work support device 10 updates the progress data (step S33). For example, the progress data generator 112 may update the progress data indicating the progress status of the calibration in the input order of the calibration points set by the calibration target setter 101. The progress data generator 112 generates the progress data to generate display data for visually recognizing which calibration point has been recorded. Since the maintenance worker is urged to shift to the next calibration point by viewing the progress data, the maintenance worker can operate the pressure generator 31 without mistake.

After the process of step S33 is executed, the calibration work support device 10 determines whether all the calibration points have been completed (step S34). For example, if the calibration target setter 101 sets the number of calibration points to five and recording of the output value of the pressure gauge 20 at the five calibration points ends, it is determined that the calibration points have ended. If it is determined that the calibration points have not ended (step S34: NO), the calibration work support device 10 returns to the process of step S21, repeats the processes of steps S21 to S34, and waits for the end of the calibration at all of the calibration points. On the other hand, if it is determined that the calibration of all of the calibration points have ended (step S34: YES), the calibration work support device 10 ends the operation shown in the flowchart.

In FIG. 7, the case of waiting for completing the calibration at all calibration points is shown, but for example, the calibration work may be interrupted after the calibration of the middle calibration point is performed, and thereafter, the interrupted calibration work may be restarted. For example, the calibration work support device 10 may store, in the data storage 106, the progress data until the interruption, and may restart the calibration work based on the stored progress data.

In FIG. 7, although the operation of the calibration has been described, the device adjuster 110 may adjust the pressure gauge 20 based on the calibration result.

Figure 8:
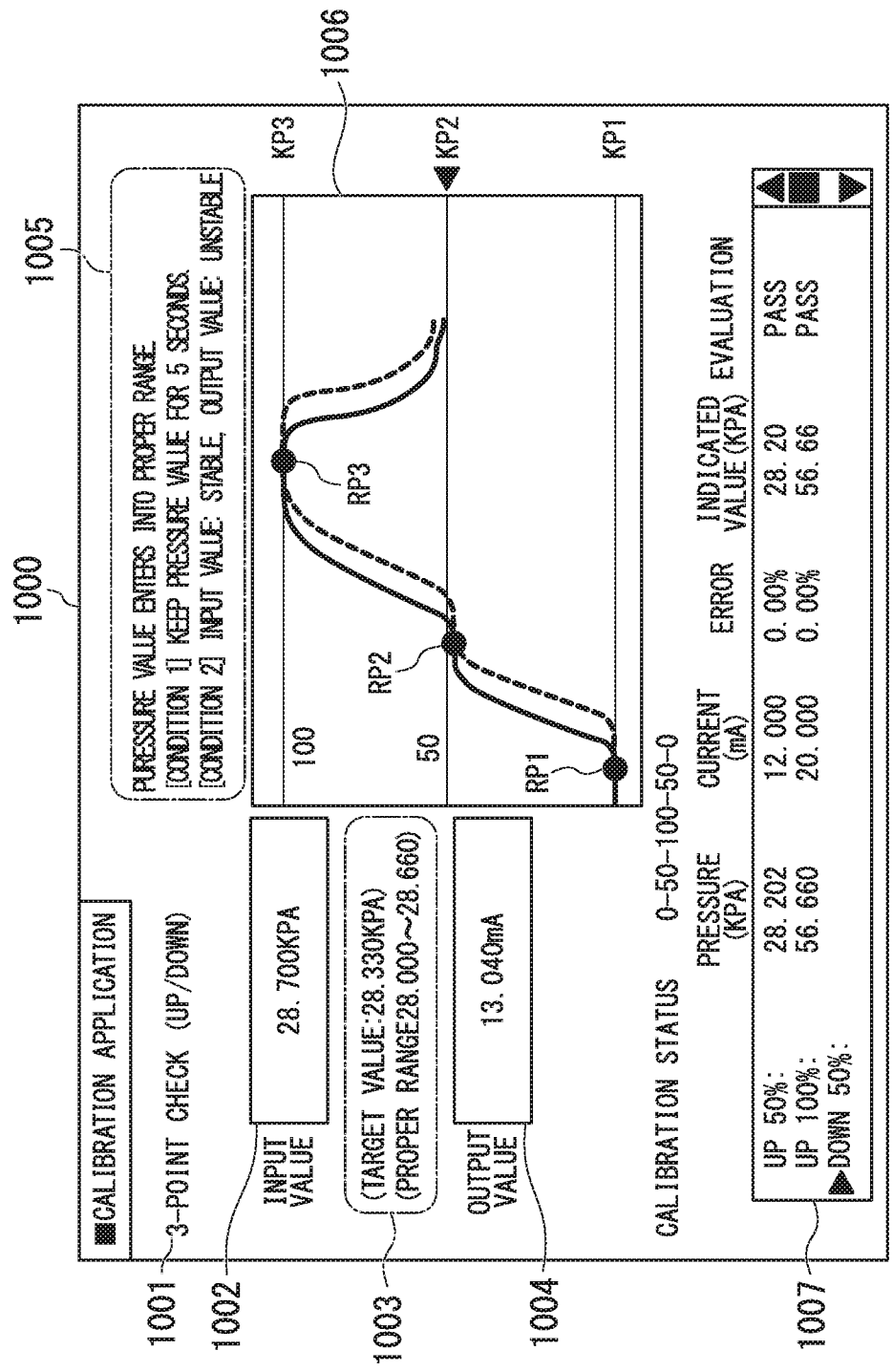
FIG. 8 is a drawing illustrating an example of a display screen of the calibration work support device in the embodiment.

Next, a display screen of the calibration work support device 10 will be described with reference to FIG. 8. FIG. 8 is a drawing illustrating an example of a display screen of the calibration work support device in the embodiment.

In FIG. 8, for example, a display area 1000 is a display area that is included in the display data output from the data output unit 107 and displayed on the display screen of the touch panel 15. The display area 1000 includes a display area 1001 to a display area 1007.

The display area 1001 displays the number of the calibration points and the ascending or descending pattern. The number of the calibration points and the ascending or descending pattern can be set by the calibration target setter 101. The display area 1001 represents that the number of the calibration points is three, and the ascending or descending pattern is Up/Down.

The display area 1002 displays an input value of the simulation signal. The input value of the simulation signal is displayed by the simulation signal acquirer 102 acquiring the input value acquired from the pressure calibrator 30. FIG. 8 shows that the input value is 28,700 KPA.

The display area 1003 displays the target value and the proper range of the simulation signal at the next calibration point. The target value of the simulation signal can be set by the calibration target setter 101. Further, the proper range can be set by the proper range setter 104a. FIG. 8 shows that the target value is 28.330 KPA and the proper range is 28.000 KPA to 28.660 KPA. The maintenance worker performing the calibration work manually operates the pressure generator 31 with reference to the display of the display area 1003 and the display of the display area 1002.

The display area 1004 displays the output value. The output value is a numerical value acquired from the pressure calibrator 30 in response to the input value of the simulation signal, and indicates an output value for a current output of 4 mA to 20 mA. FIG. 8 shows that the output value is 13.040 mA for an input value of 28.700 KPA.

The display area 1005 displays whether or not the input value is within the proper range. The proper range notifier 104c displays whether or not the input value is within the proper range. FIG. 8 shows an example of notifying that the input value is within the proper range by displaying a message "the pressure value is the proper range". For example, the proper range notifier 104c may notify that the input value is within the proper range by using a predetermined symbol and graphic, blinking characters, changing a font and color of characters, or the like. By notifying that the input value is within the proper range, the maintenance worker can interrupt the operation of the pressure generator 31 and stabilize the input value, and the workability can be improved.

The display area 1005 notifies the determination status of the condition. The condition is set by the condition setter 105a, and the condition determiner 105b updates the determination situation. In FIG. 8, two conditions of "condition 1" and "condition 2" are set, and the remaining time (5 seconds) for holding the input value within the proper range is displayed in the condition 1. The condition determiner 105b may notify that the condition 1 has been satisfied when the remaining time reaches 0 second. Moreover, the display area 1005 displays the determination result about the stability of each of the input value and the output value in the condition 2. For example, the stability of the input value and the output value can be determined using the formula (1). FIG. 8 shows that the input value is stable and the output value is unstable. By notifying the determination status of the condition, the maintenance worker can recognize that the calibration work is proceeding correctly based on the status of the input value and the output value at the calibration point, the occurrence of mistake of the work can be prevented, and the work efficiency can be improved.

The display area 1006 displays a graph showing transition of the input value and the output values over time. KP1, KP2, and KP3 indicate calibration points. For example, KP1 indicates a calibration point of a target value of 0%, KP2 indicates a calibration point of a target value of 50%, and KP3 indicates a calibration point of a target value of 100%. The transition of the input value is shown by the graph of solid line graph, and the transition of the output value is shown by the graph of broken line. It is possible to visually recognize that the output value follows the increase or decrease of the input value with delay.

The marks RP1, RP2 and RP3 which are black circles represent at the input value and the output value are recorded at each calibration point. In FIG. 8, RP1 represents that the input value and the output value has been recorded at the target value of 0%. Similarly, RP2 represents that the input value and the output value has been recorded at the target value of 50%, and RP3 represents that the input value and the output value has been recorded at the target value of 100%. Moreover, FIG. 8 shows that the input value and the output value has not been recorded at the target value of 50% in the down direction. Since the maintenance worker can visually recognize the transition of the input value and the output value in accordance with the graph displayed in the display area 1006, the maintenance worker can operate the pressure generator 31 with an appropriate operation amount.

In FIG. 8, the case of displaying the graph of the input value and the output value in the calibration work performed currently is shown, but a graph of the input value and the output value recorded in the past may be also displayed together, for example. For example, an example graph (model graph) illustrating the actually measured input value implemented by a skilled worker, which has been recorded in the past, is displayed together, and accordingly, a new maintenance worker can trace an operation of the skilled worker by operating the pressure generator 31 to trace the displayed example graph. For example, an example graph (model graph) showing a transition of the input value and the output value implemented by a skilled worker, which has been recorded in the past, is displayed together, and accordingly, a new maintenance worker can learn an operation of the skilled worker by operating the pressure generator 31 to trace the displayed example graph.

The display area 1007 displays a progress status of the calibration work. The display area 1007 includes display items of an ascending or descending pattern, a target value, pressure (KPA) current (mA), error, indicated value, and evaluation at the calibration point. The ascending or descending pattern indicates an increasing or decreasing direction of the simulation signal, and displays "UP" or "DOWN". The target value indicates a target value of the simulation signal, and displays "0%", "50%", or "100%". The pressure (KPA) indicates an input value recorded at the calibration point. The current (mA) indicates an output value recorded at the calibration point. The error indicates an error (expressed by %) between the reference value and the output value with respect to the input value. In FIG. 8, it shows that the error at each calibration point is 0.00%. The evaluation shows a result of passing or failing of the calibration, which is determined in accordance with whether or not a magnitude of the error is within a predetermined range. At a calibration point where the calibration passed, the character "PASS" is displayed. Also, at a calibration point where the calibration failed, the character "FAIL" is displayed. FIG. 8 shows that PASS or FAIL of the calibration has been determined in the calibration point of "UP" and "50%" and the calibration point of "UP" and "100%". Further, FIG. 8 shows that PASS or FAIL of the calibration has not been determined in the calibration point of "DOWN" and "50%". The maintenance worker can visually recognize the progress status of the calibration work by displaying the display area 1007. For example, work mistakes such as forgetting to record the input value and the output value at the calibration point can be reduced, and work efficiency can be improved. The display area 1007 can be scrolled when the number of calibration points is large.

As described above, the calibration work support device according to the present embodiment includes a calibration target setter configured to set a target value of a simulation signal that is input to a device in calibration of the device, a simulation signal acquirer configured to acquire an input value based on the simulation signal input to the device, a proper range determiner configured to determine whether or not the input value acquired by the simulation signal acquirer is within a proper range for the target value set by the calibration target setter, a proper range notifier configured to notify a user whether or not the input value is within the proper range, an output value acquirer configured to acquire an output value that is output from the device in accordance with the simulation signal that is input to the device, a condition determiner configured to determine whether or not at least one of the input value acquired by the simulation signal acquirer and the output value acquired by the output value acquirer satisfies a predetermined condition, and a recorder configured to record the input value and the output value if the condition determiner has determined that at least one of the input value and the output value satisfies the predetermined condition. Thereby, calibration accuracy and work efficiency can be improved.

Note that the above-described calibration work support device may be a device having the above-described function, and may be a device that is realized by, for example, a system configured of a combination of a plurality of devices in which the respective devices are connected to each other. Further, the calibration work support device may be realized as some of functions of another device connected via a network.

Furthermore, in the embodiment, a case in which a pressure gauge (a pressure transmitter) is calibrated for calibration of a device has been illustrated, but the device in which the embodiment is realized is not limited to a pressure gauge. For example, this embodiment can also be implemented in calibration of a device such as a flow meter, a level meter, a temperature transmitter, or analyzer. In this case, as the simulation signal, a simulation signal indicating a flow rate, a level, a temperature, or the like can be used. Further, the embodiment is not limited to the calibration of an input device that inputs data to a control device for a pressure gauge, a flow meter, or the like, and can also be implemented in calibration of an output device that operates on the basis of data output from a control device for a valve positioner, an electro-pneumatic positioner, an electro-pneumatic converter, or the like. For example, when the embodiment is implemented in the valve positioner, an operation signal that is output to the valve positioner may be acquired as the simulation signal, a valve opening degree may be set as a target value, and a graph of the operation signal may be generated.

Further, "acquire" in the embodiment may be "acquire" from another device or may be "acquire" from another functional unit in the same device. Further, "output" in the embodiment may be "output" from another device or may be "output" from another functional unit in the same device. For example, the simulation signal acquirer may acquire the input value based on the simulation signal from another device or may acquire a numerical value of the simulation signal generated with respect to a device that generates the simulation signal, as the input value based on the simulation signal, from another functional unit in the calibration work support device. Similarly, the data output unit may output the display data to the display device included in the calibration work support device or may output the display data to another device such as a head mount type display.

Moreover, the calibration work support method according to the present embodiment includes setting, by a calibration target setter, a target value of a simulation signal that is input to a device in calibration of the device, acquiring, by a simulation signal acquirer, an input value based on the simulation signal input to the device, determining, by a proper range determiner, whether or not the input value acquired by the simulation signal acquirer is within a proper range for the target value set by the calibration target setter, notifying, by a proper range notifier, a user whether or not the input value is within the proper range, acquiring, by an output value acquirer, an output value that is output from the device in accordance with the simulation signal that is input to the device, determining, by a condition determiner, whether or not at least one of the input value acquired by the simulation signal acquirer and the output value acquired by the output value acquirer satisfies a predetermined condition, and recording, by a recorder, the input value and the output value if the condition determiner has determined that at least one of the input value and the output value satisfies the predetermined condition. Thereby, calibration accuracy and work efficiency can be improved.

Note that the respective steps in the calibration work support method or the respective processes in the calibration work support program and the storage medium described in the embodiment are not limited in execution order. For example, in a simulation signal acquisition step of acquiring an input value based on a simulation signal input to a device and an output value acquisition step of acquiring an output value output from the device in accordance with the input simulation signal, the order of acquiring the input value and the output value is not limited thereto. In the embodiment, an exemplary case where the input value and the output value are acquired simultaneously has been described.

Further, various processes of the embodiment described above may be performed by recording a program for realizing the functions of the device described in the embodiment in a computer-readable recording medium, loading the program recorded on the recording medium to a computer system, and executing the program. Note that the "computer system" referred to herein may include an OS or hardware such as a peripheral device. Further, the "computer system" also includes a homepage providing environment (or a display environment) when a WWW system is used. Further, the "computer-readable recording medium" refers to a flexible disk, a magneto-optical disc, a ROM, or a writable nonvolatile memory such as a flash memory, a portable medium such as CD-ROM, or a storage device such as a hard disk built into the computer system.

Further, the "computer-readable recording medium" also includes a recording medium that holds a program for a certain time, such as a volatile memory (dynamic random access memory (DRAM)) inside a computer system including a server and a client when a program is transmitted via a network such as the Internet or a communication line such as a telephone line. Further, the above program may be transferred from a computer system in which the program is stored in a storage device or the like to other computer systems via a transmission medium or by transmission waves in the transmission medium. Here, the "transmission medium" for transmitting the program refers to a medium having a function of transferring information, such as a network (communication network) such as the Internet or a communication line such as a telephone line. Further, the above program may be a program for realizing some of the above-described functions. Further, the program may be a program capable of realizing the above-described functions in combination with a program previously stored in a computer system, that is, a differential file (a differential program).

As used herein, the following directional terms "front, back, above, downward, right, left, vertical, horizontal, below, transverse, row and column" as well as any other similar directional terms refer to those instructions of a device equipped with the present invention. Accordingly, these terms, as utilized to describe the present invention should be interpreted relative to a device equipped with the present invention.

The term "configured" is used to describe a component, unit or part of a device includes hardware and/or software that is constructed and/or programmed to carry out the desired function.

Moreover, terms that are expressed as "means-plus function" in the claims should include any structure that can be utilized to carry out the function of that part of the present invention.

The term "unit" is used to describe a component, unit or part of a hardware and/or software that is constructed and/or programmed to carry out the desired function. Typical examples of the hardware may include, but are not limited to, a device and a circuit.

While preferred embodiments of the present invention have been described and illustrated above, it should be understood that these are examples of the present invention and are not to be considered as limiting. Additions, omissions, substitutions, and other modifications can be made without departing from the scope of the present invention. Accordingly, the present invention is not to be considered as being limited by the foregoing description, and is only limited by the scope of the claims.

What is claimed is:

1. A calibration work support device that supports calibration work of a field device, comprising:
   a calibration target setter configured to set a target value of a simulation signal that is input from a simulation signal generator to the field device;
   a simulation signal acquirer configured to acquire an input value based on the simulation signal;

a proper range determiner configured to determine whether or not the input value acquired by the simulation signal acquirer is within a proper range for the target value set by the calibration target setter;

a proper range notifier configured to notify a user whether or not the input value is within the proper range;

an output value acquirer configured to acquire an output value that is output from the field device in accordance with the simulation signal that is input from the simulation signal generator to the field device;

a condition determiner configured to:
  determine whether or not a first condition representing that the input value acquired by the simulation signal acquirer has been within the proper range for a predetermined time is satisfied; and
  calculate a first change amount that represents a change amount of the input value based on a plurality of input values acquired by the simulation signal acquirer, and determine whether or not a second condition representing that the first change amount is within a predetermined amount is satisfied; and a recorder configured to record the input value and the output value if the condition determiner has determined that the first condition and the second condition are satisfied.

2. The calibration work support device according to claim 1, further comprising:
a proper range setter configured to preset the proper range by using at least one of an upper limit value and a lower limit value of the input value.

3. The calibration work support device according to claim 1, further comprising:
a condition setter configured to preset the first condition.

4. The calibration work support device according to claim 1,
wherein the condition determiner notifies the user of a determination status of the first condition and the second condition.

5. The calibration work support device according to claim 1, further comprising:
a calibration determiner configured to determine passing or failing of the calibration based on the input value and the output value recorded by the recorder.

6. A calibration work support method performed by a calibration work support device that supports calibration work of a field device, comprising:
setting, by a calibration target setter, a target value of a simulation signal that is input from a simulation signal generator to the field device;
acquiring, by a simulation signal acquirer, an input value based on the simulation signal;
determining, by a proper range determiner, whether or not the input value acquired by the simulation signal acquirer is within a proper range for the target value set by the calibration target setter;
notifying, by a proper range notifier, a user whether or not the input value is within the proper range;
acquiring, by an output value acquirer, an output value that is output from the field device in accordance with the simulation signal that is input from the simulation signal generator to the field device used for the calibration of the device;
determining, by a condition determiner, whether or not a first condition representing that the input value acquired by the simulation signal acquirer has been within the proper range for a predetermined time is satisfied;

calculating, by the condition determiner, a first change amount that represents a change amount of the input value based on a plurality of input values acquired by the simulation signal acquirer;
determining, by the condition determiner, whether or not a second condition representing that the first change amount is within a predetermined amount is satisfied; and
recording, by a recorder, the input value and the output value if the condition determiner has determined that the first condition and the second condition are satisfied.

7. The calibration work support method according to claim 6, further comprising:
presetting, by a proper range setter, the proper range by using at least one of an upper limit value and a lower limit value of the input value.

8. The calibration work support method according to claim 6, further comprising:
presetting the first condition by a condition setter.

9. The calibration work support method according to claim 6, further comprising:
notifying, by the condition determiner, the user of a determination status of the first condition and the second condition.

10. The calibration work support method according to claim 6, further comprising:
determining, by a calibration determiner, passing or failing of the calibration based on the input value and the output value recorded by the recorder.

11. A non-transitory computer readable storage medium storing one or more calibration work support programs configured for execution by a computer of a calibration work support device that supports calibration work of a field device, the one or more calibration work support programs comprising instructions for:
setting a target value of a simulation signal that is input from a simulation signal generator to the field device;
acquiring an input value based on the simulation signal;
determining whether or not the input value is within a proper range for the target value;
notifying a user whether or not the input value is within the proper range;
acquiring an output value that is output from the field device in accordance with the simulation signal that is input from the simulation signal generator to the field device;
determining whether or not a first condition representing that the input value has been within the proper range for a predetermined time is satisfied;
calculating a first change amount that represents a change amount of the input value based on a plurality of input values that have been acquired;
determining whether or not a second condition representing that the first change amount is within a predetermined amount is satisfied; and
recording the input value and the output value if it has been determined that the first condition satisfied.

12. The non-transitory computer readable storage medium according to claim 11,
wherein the one or more calibration work support programs further comprises instructions for:
presetting, by a proper range setter, the proper range by using at least one of an upper limit value and a lower limit value of the input value.

13. The non-transitory computer readable storage medium according to claim 11, wherein the one or more calibration work support programs further comprises instructions for:
presetting the first condition by a condition setter.

14. The non-transitory computer readable storage medium according to claim 11,
wherein the one or more calibration work support programs further comprises instructions for:
notifying, by the condition determiner, the user of a determination status of the first condition and the second condition.

\* \* \* \* \*